United States Patent
Kray et al.

(10) Patent No.: US 10,145,382 B2
(45) Date of Patent: Dec. 4, 2018

(54) METHOD AND SYSTEM FOR SEPARABLE BLADE PLATFORM RETENTION CLIP

(71) Applicant: General Electric Company, Schenectady, NY (US)

(72) Inventors: Nicholas Joseph Kray, Mason, OH (US); Jan Christopher Schilling, Liberty Township, OH (US); Nitesh Jain, Karnataka (IN); Abhijit Roy, Karnataka (IN)

(73) Assignee: General Electric Company, Schenectady, NY (US)

( * ) Notice: Subject to any disclaimer, the term of this patent is extended or adjusted under 35 U.S.C. 154(b) by 323 days.

(21) Appl. No.: 14/985,169

(22) Filed: Dec. 30, 2015

(65) Prior Publication Data
US 2017/0191493 A1    Jul. 6, 2017

(51) Int. Cl.
| | |
|---|---|
| *F01D 11/00* | (2006.01) |
| *F04D 29/32* | (2006.01) |
| *F04D 29/02* | (2006.01) |
| *F01D 5/14* | (2006.01) |
| *F01D 5/28* | (2006.01) |
| *F01D 5/30* | (2006.01) |

(52) U.S. Cl.
CPC .......... *F04D 29/324* (2013.01); *F01D 5/147* (2013.01); *F01D 11/008* (2013.01);
(Continued)

(58) Field of Classification Search
CPC ...... F01D 5/3007; F01D 11/008; F01D 5/323; F01D 5/326; F04D 29/34
See application file for complete search history.

(56) References Cited

U.S. PATENT DOCUMENTS

| | | |
|---|---|---|
| 3,041,040 A | 6/1962 | Levinstein |
| 3,567,337 A | 3/1971 | Zerlauth et al. |
| 4,019,832 A * | 4/1977 | Salemme ................. F01D 5/30 |
| | | 416/135 |

(Continued)

FOREIGN PATENT DOCUMENTS

WO    2014190008 A1    11/2014

OTHER PUBLICATIONS

Extended European Search Report and Opinion issued in connection with corresponding EP Application No. 16203101.7 dated Apr. 25, 2017.

*Primary Examiner* — Jason Shanske
*Assistant Examiner* — Behnoush Haghighian
(74) *Attorney, Agent, or Firm* — General Electric Company; Brian Overbeck

(57) ABSTRACT

A composite blade assembly and a method of assembling a composite blade are provided. The composite blade assembly includes a composite blade having a radially inner root. A composite blade assembly includes a first platform and a circumferentially adjacent second platform abutting the first platform at a platform joint. Each of the first platform and the second platform includes a radially outer surface and a radially inwardly extending attachment member. The platform joint includes a slot extending through adjacent edges of the first platform and the second platform. The slot is configured to receive the radially inner root and the radially inner root is configured to be sandwiched between the attachment members. The blade assembly includes an adhesive system configured to join the radially inner root of the composite blade and the attachment members into a unitary structure, and a retaining clip configured to bias the attachment members towards each other.

16 Claims, 5 Drawing Sheets

(52) U.S. Cl.
CPC ......... *F04D 29/023* (2013.01); *F04D 29/322* (2013.01); *F01D 5/282* (2013.01); *F01D 5/30* (2013.01); *F05D 2220/32* (2013.01); *F05D 2230/20* (2013.01); *F05D 2230/23* (2013.01); *F05D 2230/60* (2013.01); *F05D 2240/30* (2013.01); *F05D 2240/80* (2013.01); *F05D 2260/30* (2013.01); *F05D 2300/603* (2013.01); *Y02T 50/672* (2013.01); *Y02T 50/673* (2013.01)

(56) References Cited

U.S. PATENT DOCUMENTS

| | | | |
|---|---|---|---|
| 4,080,101 A | 3/1978 | Zlotek | |
| 4,171,930 A | 10/1979 | Brisken et al. | |
| 5,518,369 A | 5/1996 | Modafferi | |
| 6,086,329 A | 7/2000 | Tomita et al. | |
| 6,109,877 A | 8/2000 | Gekht et al. | |
| 6,619,924 B2 | 9/2003 | Miller | |
| 6,837,686 B2 | 1/2005 | Di Paola et al. | |
| 7,491,032 B1 | 2/2009 | Powell et al. | |
| 8,011,877 B2 | 9/2011 | Schilling et al. | |
| 8,905,719 B2 | 12/2014 | Kray et al. | |
| 9,017,033 B2 * | 4/2015 | Brown | F01D 5/147 416/193 A |
| 9,376,916 B2 * | 6/2016 | McCaffrey | F01D 5/147 |
| 2013/0156594 A1 | 6/2013 | Kray et al. | |
| 2014/0086751 A1 * | 3/2014 | Bottome | F01D 11/006 416/193 R |
| 2016/0130955 A1 * | 5/2016 | Kray | F01D 5/282 416/241 R |

* cited by examiner

METHOD AND SYSTEM FOR SEPARABLE BLADE PLATFORM RETENTION CLIP

BACKGROUND

The field of the disclosure relates generally to gas turbine engines and, more particularly, to a method and system for reinforcing bonded joints in bladed rotatable members.

At least some known gas turbine engines use composite materials in, for example, compressor blades. In many respects, composite materials are superior to traditional materials used in gas turbine engines. In many applications they are at least as strong as traditional materials and the weight savings realized when using composite components makes their use very attractive. However, in various applications, the properties of composite materials alone may be insufficient. For example, foreign debris entering a core engine inlet will encounter the blades of a booster compressor or a high pressure compressor. Such an event typically causes damage to the blades of the compressor. In some cases, portions of the blade may separate from other portions of the blade.

BRIEF DESCRIPTION

In one aspect, a composite blade assembly includes a composite blade that includes a radially inner root, a radially outer tip, and an airfoil extending therebetween. The radially inner root includes a dovetail. The composite blade assembly also includes a composite blade assembly that includes a first platform and a circumferentially adjacent second platform abutting the first platform at a platform joint. Each of the first platform and the second platform includes a radially outer surface and a radially inwardly extending attachment member. The platform joint includes an axially extending slot extending through adjacent edges of the first platform and the second platform. The slot is configured to receive the radially inner root and the radially inner root is configured to be sandwiched between the attachment members. The composite blade assembly includes an adhesive system configured to join the radially inner root of the composite blade and the attachment members into a unitary structure and a retaining clip configured to bias the attachment members towards each other.

In another aspect, a method of assembling a separable blade includes providing a compressor blade including a radially outer tip, a radially inner root, and an airfoil extending therebetween. The method also includes providing a pair of platform members wherein each platform member includes a radially outer platform surface and a radially inwardly extending attachment member. The method further includes joining the compressor blade and the attachment members together and clamping the compressor blade and the attachment members together using a mechanical bias member.

In yet another aspect, a turbofan engine includes a core engine including a multistage compressor, a booster compressor powered by a power turbine driven by gas generated in the core engine, and a composite blade assembly. The composite blade assembly includes a composite blade that includes a radially inner root, a radially outer tip, and an airfoil extending therebetween. The radially inner root includes a dovetail. The composite blade assembly also includes a composite blade assembly including a first platform and a circumferentially adjacent second platform abutting the first platform at a platform joint. Each of the first platform and the second platform includes a radially outer surface and a radially inwardly extending attachment member. The platform joint includes an axially extending slot extending through adjacent edges of the first platform and the second platform. The slot is configured to receive the radially inner root and the radially inner root is configured to be sandwiched between the attachment members. The composite blade assembly further includes an adhesive system configured to join the radially inner root of the composite blade and the attachment members into a unitary structure and a retaining clip configured to bias the attachment members towards each other. This retaining clip can also provide a secondary load path to retain the platforms together should the adhesive bond fail.

DRAWINGS

These and other features, aspects, and advantages of the present disclosure will become better understood when the following detailed description is read with reference to the accompanying drawings in which like characters represent like parts throughout the drawings, wherein.

Figure 1:
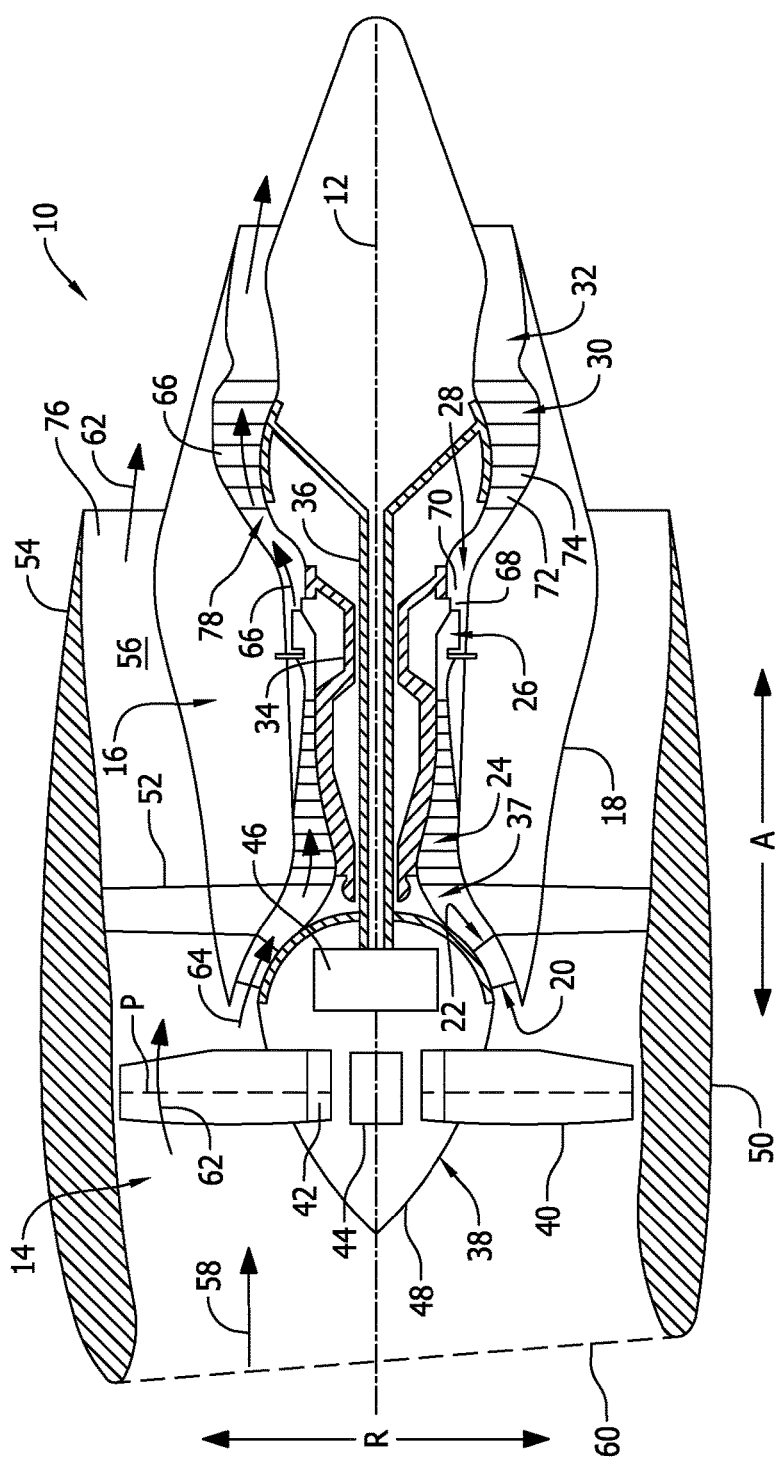
FIG. 1 is a schematic illustration of an exemplary gas turbine engine in accordance with an example embodiment of the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of the composite blade assembly described herein provide a cost-effective method for retaining a separable blade even if an adhesive system holding portions of the blade together is completely disbanded by using a retainer clip to hold the three pieces of the blade together. The composite blade assembly includes a composite blade and a composite blade assembly joined together using an adhesive system configured to join the composite blade and the composite blade assembly into a unitary structure, and a retaining clip configured to clamp the composite blade and the composite blade assembly together. The composite blade includes a radially inner root, a radially outer tip, and an airfoil extending therebetween, the radially inner root includes a dovetail. The composite blade assembly includes a first platform and a circumferentially adjacent second platform abutting the first platform at a platform joint. Each of the first platform and the second platform includes a radially outer surface and a radially inwardly extending attachment member. The platform joint includes an axially extending slot extending through adjacent edges of the first platform and the second platform. The slot is configured to receive the radially inner root and the radially inner root is configured to be sandwiched between the attachment members.

FIG. 1 is a schematic cross-sectional view of a gas turbine engine 10 in accordance with an exemplary embodiment of the present disclosure. In the example embodiment, gas turbine engine 10 is embodied in a high-bypass turbofan jet engine. As shown in FIG. 1, the turbofan engine 10 defines an axial direction A (extending parallel to a longitudinal axis 12 provided for reference) and a radial direction R. In general, the turbofan 10 includes a fan section 14 and a core turbine engine 16 disposed downstream from the fan section 14.

In the example embodiment, core turbine engine 16 includes an approximately tubular outer casing 18 that defines an annular inlet 20. Outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

In the example embodiment, fan section 14 includes a variable pitch fan 38 having a plurality of fan blades 40 coupled to a disk 42 in a spaced apart relationship. Fan blades 40 extend radially outwardly from disk 42. Each fan blade 40 is rotatable relative to the disk 42 about a pitch axis P by virtue of the fan blades 40 being operatively coupled to a suitable pitch change mechanism (PCM) 44 configured to vary the pitch of the fan blades 40. In other embodiments, pitch change mechanism (PCM) 44 configured to collectively vary the pitch of the fan blades 40 in unison. Fan blades 40, disk 42, and pitch change mechanism 44 are together rotatable about longitudinal axis 12 by LP shaft 36 across a power gear box 46. Power gear box 46 includes a plurality of gears for adjusting the rotational speed of the fan 38 relative to the LP shaft 36 to a more efficient rotational fan speed.

Disk 42 is covered by rotatable front hub 48 aerodynamically contoured to promote an airflow through the plurality of fan blades 40. Additionally, fan section 14 includes an annular fan casing or outer nacelle 50 that circumferentially surrounds fan 38 and/or at least a portion of the core turbine engine 16. In the example embodiment, nacelle 50 is configured to be supported relative to the core turbine engine 16 by a plurality of circumferentially-spaced outlet guide vanes 52. Moreover, a downstream section 54 of nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As volume of air 58 passes across fan blades 40, a first portion 62 of volume of air 58 is directed or routed into bypass airflow passage 56 and a second portion 64 of volume of air 58 is directed or routed into the core air flowpath 37, or more specifically into the LP compressor 22. A ratio between first portion 62 and second portion 64 is commonly referred to as a bypass ratio. The pressure of second portion 64 is then increased as it is routed through the high pressure (HP) compressor 24 and into the combustion section 26, where it is mixed with fuel and burned to provide combustion gases 66.

Combustion gases 66 are routed through HP turbine 28 where a portion of thermal and/or kinetic energy from combustion gases 66 is extracted via sequential stages of HP turbine stator vanes 68 that are coupled to outer casing 18 and HP turbine rotor blades 70 that are coupled to HP shaft or spool 34, thus causing HP shaft or spool 34 to rotate, which then drives a rotation of HP compressor 24. Combustion gases 66 are then routed through LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, which drives a rotation of LP shaft or spool 36 and LP compressor 22 and/or rotation of fan 38.

Combustion gases 66 are subsequently routed through jet exhaust nozzle section 32 of core turbine engine 16 to provide propulsive thrust. Simultaneously, the pressure of the first portion 62 is substantially increased as first portion 62 is routed through bypass airflow passage 56 before it is exhausted from a fan nozzle exhaust section 76 of turbofan 10, also providing propulsive thrust. HP turbine 28, LP turbine 30, and jet exhaust nozzle section 32 at least partially define a hot gas path 78 for routing the combustion gases 66 through core turbine engine 16.

Turbofan engine 10 is depicted in FIG. 1 by way of example only, and that in other exemplary embodiments, turbofan engine 10 may have any other suitable configuration including for example, a turboprop engine.

Figure 2:
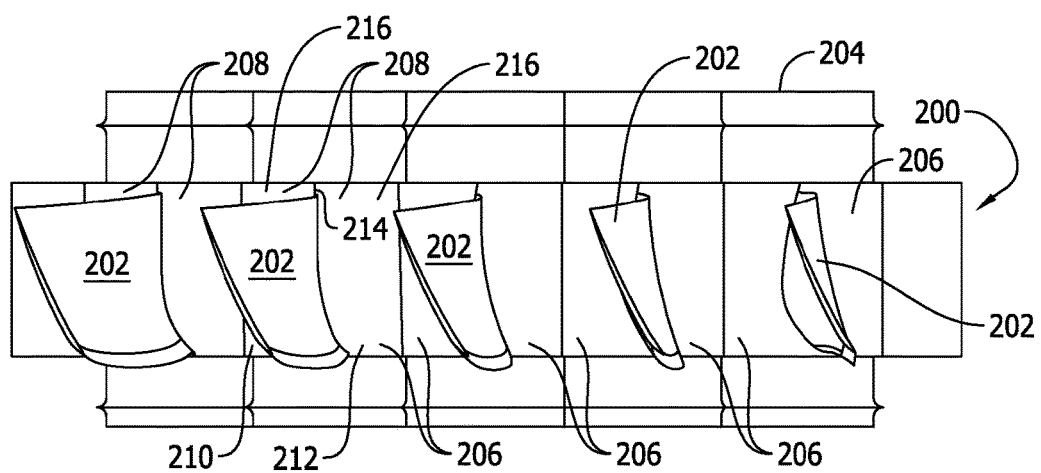
FIG. 2 is a plan view looking radially inwardly on a row of blades that may be used with turbofan engine shown in FIG. 1.

FIG. 2 is a plan view looking radially inwardly on a row 200 of composite blades 202 that may be used with turbofan engine 10 (shown in FIG. 1). In the exemplary embodiment, row 200 is formed on a disk or rotor 204 of a rotating machine, such as HP compressor 24. A plurality of platforms 206 are spaced circumferentially about rotor 204 in adjacent pairs 208. Each pair 208 forms a portion of a composite blade assembly 209. Composite blade assembly 209 includes a first platform 210 and a second platform 212. First platform 210 and circumferentially adjacent second platform 212 abut at a platform joint 214. Each of first platform 210 and second platform 212 include a radially outer surface 216.

Figure 3:
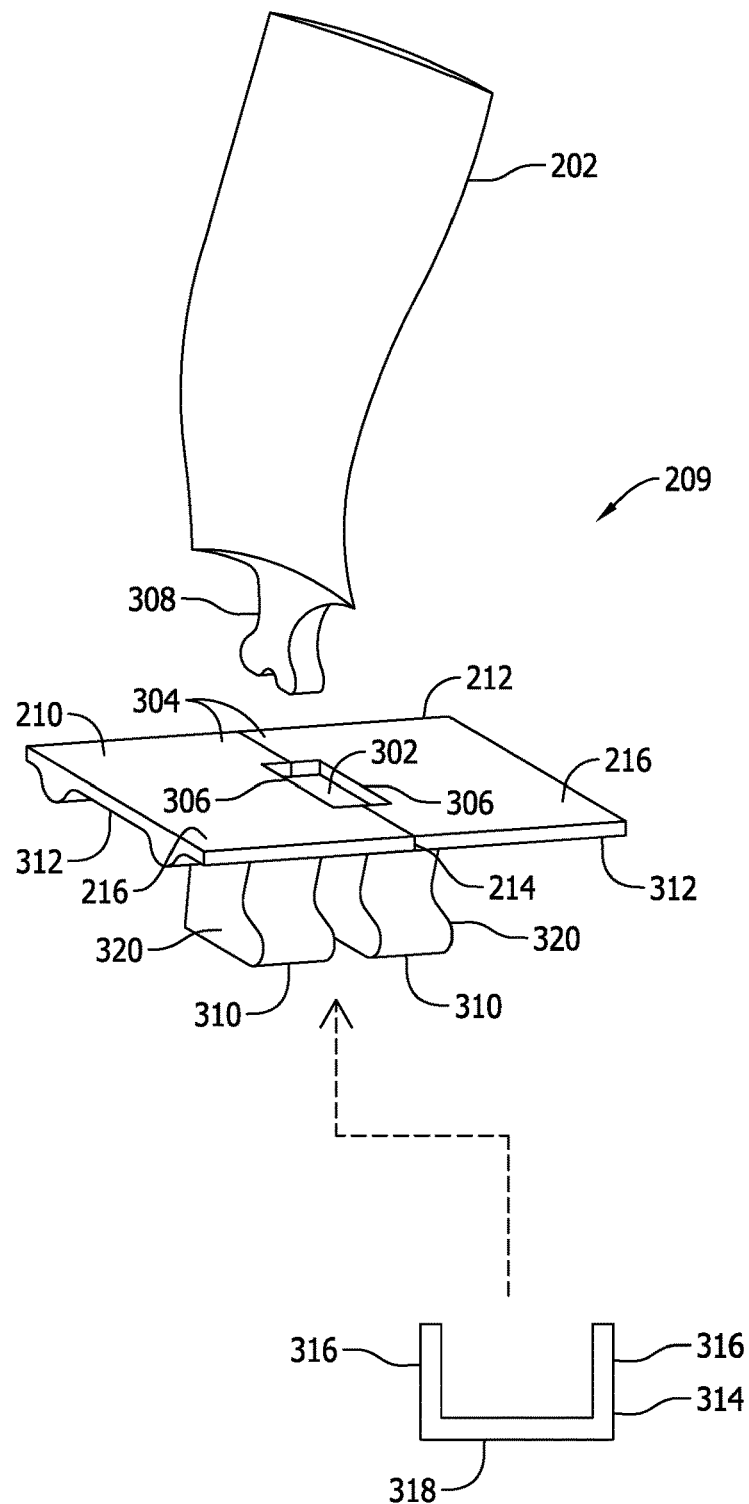
FIG. 3 is a perspective view of a partially assembled blade assembly.

FIG. 3 is a perspective view of a partially assembled composite blade assembly 209 in accordance with an example embodiment of the present disclosure. In the example embodiment, platform joint 214 includes an axially extending slot 302 extending through adjacent edges 304 of first platform 210 and second platform 212. Slot 302 is formed by a concave cutout 306 in each of edges 304. Slot 302 is sized and positioned to receive a radially inner root 308 of blade 202. Radially inner root 308 is configured to be sandwiched between attachment members 310 extending radially inwardly from a radially inner surface 312 of first platform 210 and second platform 212. A retention clip 314 includes a pair of legs 316 coupled or formed at opposing ends of a bias member 318. Retention clip 314 is configured to engage circumferentially opposite faces 320 of attachment members 310 and to bias attachment members 310 towards each other in a clamping fashion.

Figure 4:
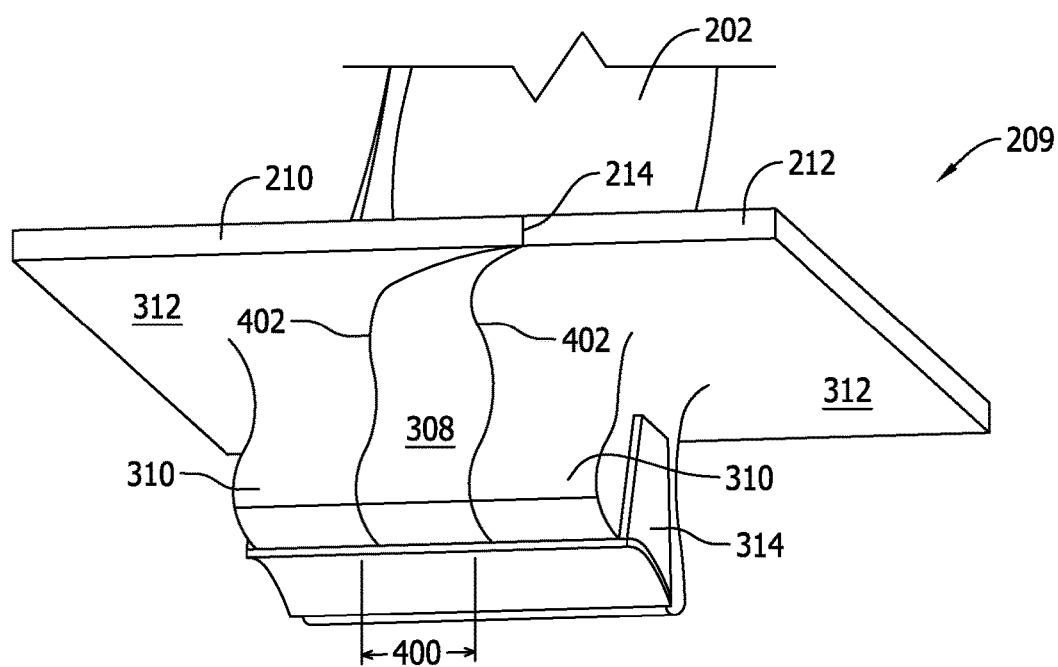
FIG. 4 is a perspective view of an assembled blade assembly.

FIG. 4 is a perspective view of assembled composite blade assembly 209 in accordance with an example embodiment of the present disclosure. In the example embodiment, attachment members 310 extend radially inwardly from radially inner surface 316 of first platform 210 and second platform 212. In the example embodiment, attachment members 310 are separated with respect to each other by a gap 400, which provides a space where radially inner root 308 of blade 202 is received and sandwiched between attachment members 310. An adhesive system 402 is applied between adjacent faces of radially inner root 308 of blade 202 and each of attachment members 310. Although described as an adhesive system, adhesive system 402 may include other forms of bonding of radially inner root 308 of blade 202 to each of attachment members 310.

Figure 5:
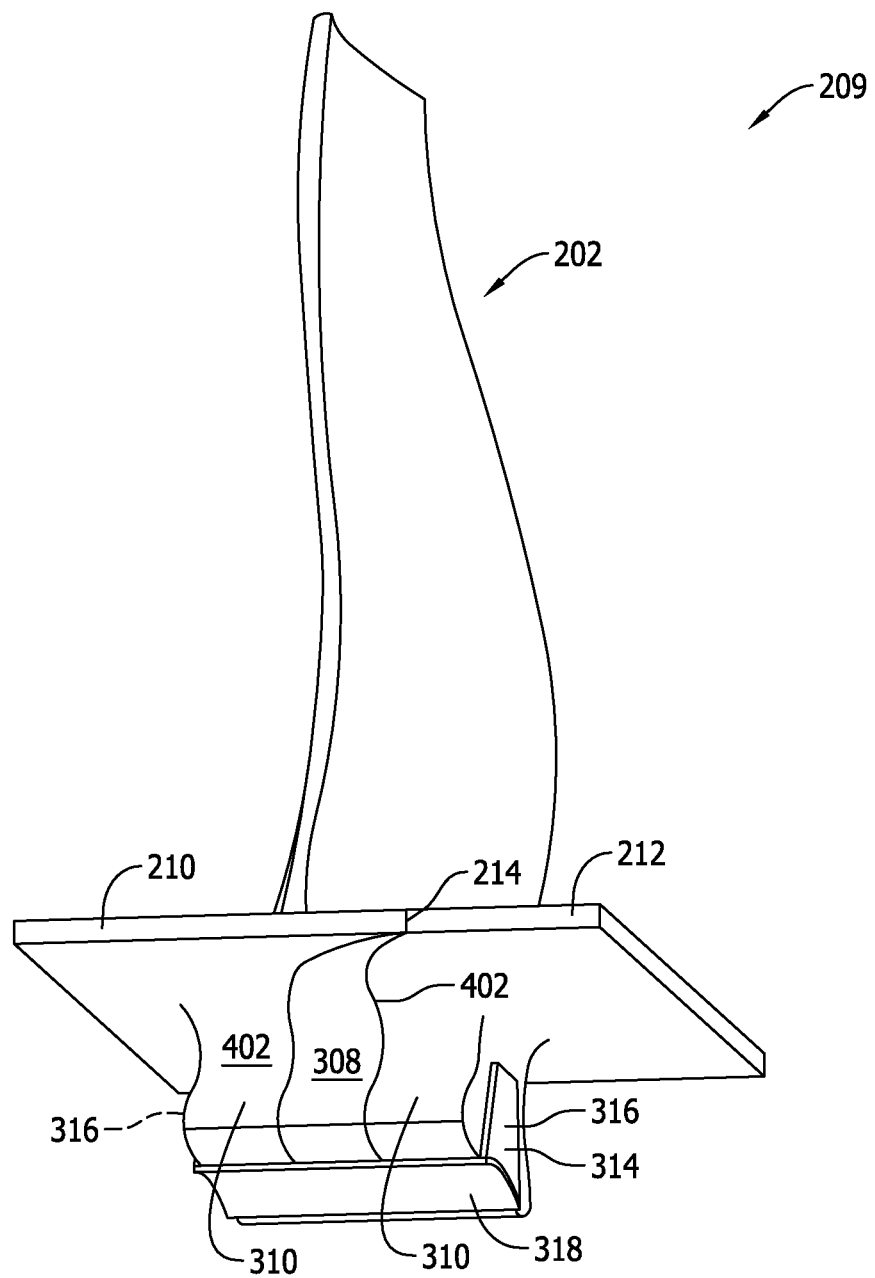
FIG. 5 is another perspective view of an assembled blade assembly.

FIG. 5 is another perspective view of an assembled composite blade assembly 209 in accordance with an example embodiment of the present disclosure. In the example embodiment, attachment members 310 extend radially inwardly from radially inner surface 316 of first platform 210 and second platform 212. In the example embodiment, attachment members 310 are separated with respect to each other by a gap 400, which provides a space where radially inner root 308 of blade 202 is received and sandwiched between attachment members 310. An adhesive system 402 is applied between adjacent faces of radially inner root 308 of blade 202 and each of attachment members 310. Although described as an adhesive system, adhesive system 402 may include other forms of bonding of radially inner root 308 of blade 202 to each of attachment members 310.

During operation, blades 202 of a compressor, such as, booster compressor 22 may be subject to a strike in a substantially axial direction by foreign objects that may enter inlet 20. Such a strike may impart significant forces to blades 202, which ends to break purely adhesive bonds, which are used to form blades 202 with other components to fabricate, for example, composite blade assembly 209. To facilitate maintaining composite blade assembly 209 within acceptable performance characteristics after a foreign object strike event, retention clip 314 is configured to engage circumferentially opposite faces 320 of attachment members 310 using legs 316, which are coupled or formed at opposing ends of bias member 318. Retention clip 314 clamps attachment members 310 to radially inner root 308 to support adhesive system 402 in maintaining attachment members 310 and radially inner root 308 bonded together in a unitary structure after a foreign object strike. Other engine conditions may also cause the adhesive bonds to fail such as extreme rub conditions caused by unbalance or general fatigue whereas the retention clip provides a secondary load path to aid in overall product reliability.

The above-described embodiments of a method and a system of a composite blade retention system provides a cost-effective and reliable means for reducing the effects of a separation of blade portions during an event such a foreign object strike. More specifically, the methods and systems described herein facilitate maintaining separable portions of the blade contained when the adhesive system disbands completely during the event. As a result, the methods and systems described herein facilitate using composite materials in applications where one of the properties of the composite material needs support in a cost-effective and reliable manner.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A composite blade assembly comprising: a composite blade comprising a radially inner root, a radially outer tip, and an airfoil extending therebetween, said radially inner root comprising a dovetail; a first platform and a circumferentially adjacent second platform abutting said first platform at a platform joint, each of said first platform and said second platform comprising a radially outer surface and a radially inwardly extending attachment member, said platform joint comprising an axially extending slot extending through adjacent edges of said first platform and said second platform, said slot configured to receive said radially inner root, said radially inner root configured to be sandwiched between said attachment members; an adhesive system configured to join said radially inner root of said composite blade and said attachment members into a unitary structure; and a retaining clip configured to bias said attachment members towards each other, wherein said retaining clip comprises a bias member coupled to a pair of legs extending orthogonally from said bias member so as to engage with circumferentially opposite faces of said attachment members, and wherein the attachment members are separated with respect to each other by a gap into which the radially inner root is received.

2. The assembly of claim 1, wherein said retaining clip is formed of at least one of a metallic material and a composite material.

3. The assembly of claim 1, wherein said retaining clip is configured to exert a clamping force on said attachment members and said radially inner root of said composite blade.

4. The assembly of claim 1, wherein said retaining clip is configured to resist a separation of said composite blade and said composite blade assembly.

5. The assembly of claim 1, wherein said composite blade comprises a composite blade of a booster compressor.

6. A method of assembling a separable blade, said method comprising: providing a compressor blade including a radially outer tip, a radially inner root, and an airfoil extending therebetween; providing a pair of platform members, each platform member comprising a radially outer platform surface and a radially inwardly extending attachment member; joining the compressor blade and the attachment members together; and clamping the compressor blade and the attachment members together using a retaining clip, wherein said retaining clip comprises a bias member coupled to a pair of legs extending orthogonally from said bias member so as to engage with circumferentially opposite faces of said attachment members, and wherein the attachment members are separated with respect to each other by a gap into which the radially inner root is received.

7. The method of claim 6, wherein each platform member comprises an axially extending slot in adjacent edges of the radially outer platform surfaces of the pair of platform members.

8. The method of claim 6, wherein joining the compressor blade and the attachment members together comprises using an adhesive applied to adjacent faces of the compressor blade and the attachment members.

9. The method of claim 6, wherein joining the compressor blade and the attachment members together comprises bonding the compressor blade and the attachment members together.

10. The method of claim 6, wherein clamping the compressor blade and the attachment members together using the bias member comprises attaching a respective retaining clip leg to each of the circumferentially opposing faces of the attachment members.

11. The method of claim 10, wherein attaching the retaining clip leg to circumferentially opposing faces of the attachment members comprises biasing the circumferentially opposing faces of the attachment members using the bias member coupled to said respective retaining clip legs.

12. The method of claim 10, wherein attaching the retaining clip leg to circumferentially opposing faces of the attachment members comprises adhering the retaining clip leg to the circumferentially opposing faces of the attachment members and the compressor blade.

13. A turbofan engine comprising: a core engine including a multistage compressor; a booster compressor powered by a power turbine driven by gas generated in said core engine; and a composite blade assembly comprising: a composite blade comprising a radially inner root, a radially outer tip, and an airfoil extending therebetween, said radially inner root comprising a dovetail; a first platform and a circumferentially adjacent second platform abutting said first platform at a platform joint, each of said first platform and said second platform comprising a radially outer surface and a radially inwardly extending attachment member, said platform joint comprising an axially extending slot extending through adjacent edges of said first platform and said second platform, said slot configured to receive said radially inner root, said radially inner root configured to by sandwiched between said attachment members; and a retaining clip formed of at least one of a metallic material and a composite material and configured to bias said attachment members towards each other, wherein said retaining clip comprises a bias member coupled to a pair of legs extending orthogonally from said bias member so as to engage with circumferentially opposite faces of said attachment members, and wherein the attachment members are separated with respect to each other by a gap into which the radially inner root is received.

14. The engine of claim 13, further comprising an adhesive system configured to join said radially inner root of said composite blade and said attachment members into a unitary structure.

15. The engine of claim 13, wherein said retaining clip is configured to exert a clamping force on said attachment members and said radially inner root of said composite blade.

16. The system of claim 13, wherein said retaining clip is configured to resist a separation of said composite blade and said composite blade assembly.

* * * * *